United States Patent
Fujita et al.

(10) Patent No.: US 12,109,682 B2
(45) Date of Patent: Oct. 8, 2024

(54) ASSISTANCE FOR ROBOT MANIPULATION

(71) Applicants: TOKYO INSTITUTE OF TECHNOLOGY, Tokyo (JP); KABUSHIKI KAISHA YASKAWA DENKI, Kitakyushu (JP)

(72) Inventors: Masayuki Fujita, Tokyo (JP); Takeshi Hatanaka, Tokyo (JP); Junya Yamauchi, Tokyo (JP); Kosei Noda, Tokyo (JP); Keita Shimamoto, Fukuoka (JP); Koji Sokabe, Fukuoka (JP); Ryokichi Hirata, Fukuoka (JP); Masaru Adachi, Fukuoka (JP)

(*) Notice: Subject to any disclaimer, the term of this patent is extended or adjusted under 35 U.S.C. 154(b) by 252 days.

(21) Appl. No.: 17/816,727

(22) Filed: Aug. 2, 2022

(65) Prior Publication Data

US 2022/0371203 A1    Nov. 24, 2022

Related U.S. Application Data (63) Continuation of application No. PCT/JP2020/016460, filed on Apr. 14, 2020.

(Continued)

(51) Int. Cl.
  *B25J 13/00* (2006.01)
  *B25J 9/16* (2006.01)
  *B25J 13/06* (2006.01)

(52) U.S. Cl.
  CPC .............. *B25J 13/06* (2013.01); *B25J 9/163* (2013.01)

(58) Field of Classification Search
  None
  See application file for complete search history.

(56) References Cited

U.S. PATENT DOCUMENTS 5,579,442 A * 11/1996 Kimoto ............... B25J 9/161
                                                              700/251
6,445,964 B1 * 9/2002 White ................. B25J 9/1689
                                                              706/920

(Continued)

FOREIGN PATENT DOCUMENTS

JP    2019-202404    11/2019

OTHER PUBLICATIONS

Hiroshi Igarashi, Operation assist with human input prediction and its effect, ("2. Synthetic human operation model", "3. Human operation reliability", "5. Conclusions", fig. 1), The 27th Annual Conference of the Robotics Society of Japan, The Robotics Society of Japan, Sep. 15, 2009, RSJ2009AC3C2-6.

(Continued)

*Primary Examiner* — Truc M Do
(74) *Attorney, Agent, or Firm* — SOEI PATENT & LAW FIRM (57) ABSTRACT

A robot control system includes circuitry configured to: acquire an input command value indicating a manipulation of a robot by a subject user; acquire a current state of the robot and a target state associated with the manipulation of the robot; determine a state difference between the current state and the target state; acquire from a learned model, a degree of distribution associated with a motion of the robot, based on the state difference, wherein the learned model is generated based on a past robot manipulation; set a level of assistance to be given during the manipulation of the robot by the subject user, based on the degree of distribution acquired; and generate an output command value for operating the robot, based on the input command value and the level of assistance.

20 Claims, 7 Drawing Sheets

Related U.S. Application Data (60) Provisional application No. 62/969,171, filed on Feb. 3, 2020.

(56) References Cited

U.S. PATENT DOCUMENTS

| | | | | |
|---|---|---|---|---|
| 9,914,213 | B2* | 3/2018 | Vijayanarasimhan | ........................ B25J 9/1697 |
| 10,792,810 | B1* | 10/2020 | Beckman | ................. B25J 9/163 |
| 2013/0245824 | A1* | 9/2013 | Barajas | ................. B25J 9/1664 901/46 |
| 2018/0021952 | A1* | 1/2018 | Fujieda | .............. G05B 19/4069 700/264 |
| 2019/0077007 | A1* | 3/2019 | Mallinson | ............ A61B 5/1128 |
| 2021/0220990 | A1 | 7/2021 | Hasunuma et al. | |

OTHER PUBLICATIONS

Takamitsu Matsubara, "Robot motor control and learning based on gaussian processes-approximate inference by analytic moment matching,("1.Introduction", "2. Preparation: probabilistic inference of state-space model", "3. Approximate inference by analytic moment matching of GP state-space model", "4. Application to robot motor control and learning")", Systems, Control and Information, Dec. 15, 2016, p. 515-p. 520, vol. 60 No. 12 (with English Partial Translation).

International Search Report dated Jul. 7, 2020 for PCT/JP2020/016460.

International Preliminary Report on Patentability with Written Opinion dated Aug. 18, 2022 for PCT/JP2020/016460.

Office Action issued in Japanese Patent Application No. P2021-575596, dated Nov. 21, 2023 (with English partial translation).

* cited by examiner

| USER | TASK | | | | |
|---|---|---|---|---|---|
| | Ta | Tb | Tc | Td | ... |
| Ux | MO$_{xa}$ | MO$_{xb}$ | MO$_{xc}$ | MO$_{xd}$ | ... |
| Uy | MO$_{ya}$ | MO$_{yb}$ | MO$_{yc}$ | MO$_{yd}$ | ... |
| Uz | MO$_{za}$ | MO$_{zb}$ | MO$_{zc}$ | MO$_{zd}$ | ... |
| ... | ... | ... | ... | ... | ... |

171

| TASK | | | |
|---|---|---|---|
| Ta | Tb | Tc | Td | ... |
| ME$_a$ | ME$_b$ | ME$_c$ | ME$_d$ | ... |

172

17

*Fig.7*

ASSISTANCE FOR ROBOT MANIPULATION

CROSS-REFERENCE TO RELATED APPLICATIONS

This application is a continuation application of PCT Application No. PCT/JP2020/016460, filed on Apr. 14, 2020, which claims the benefit of priority from U.S. Provisional Application No. 62/969,171, filed on Feb. 3, 2020, the entire contents of which are incorporated herein by reference.

BACKGROUND

Japanese Patent Publication No. 2019-202404 A describes a robot system that estimates an arithmetic operation force based on operation data detected by an operation sensor, surrounding environment data detected by a surrounding environment sensor, and an operation command output by a relay device, using a model constructed by machine learning of operator operation forces, surrounding environment data, operation data, and operation commands.

SUMMARY

A robot control system according to an aspect of the present disclosure includes circuitry configured to: acquire an input command value indicating a manipulation of a robot by a subject user; acquire a current state of the robot and a target state associated with the manipulation of the robot; determine a state difference between the current state and the target state; acquire from a learned model, a degree of distribution associated with a motion of the robot, based on the state difference, wherein the learned model is generated based on a past robot manipulation; set a level of assistance to be given during the manipulation of the robot by the subject user, based on the degree of distribution acquired; and generate an output command value for operating the robot, based on the input command value and the level of assistance.

A robot control method according to an aspect of the present disclosure is executable by a robot control system including at least one processor. The method includes: acquiring an input command value indicating a manipulation of a robot by a subject user; acquiring a current state of the robot and a target state associated with the manipulation of the robot; determining a state difference between the current state and the target state; acquiring from a learned model, a degree of distribution associated with a motion of the robot, based on the state difference, wherein the learned model is generated based on a past robot manipulation; setting a level of assistance to be given during the manipulation of the robot by the subject user, based on the degree of distribution acquired; and generating an output command value for operating the robot, based on the input command value and the level of assistance.

A non-transitory computer-readable storage medium according to an aspect of the present disclosure stores processor-executable instructions to: acquire an input command value indicating a manipulation of a robot by a subject user; acquire a current state of the robot and a target state associated with the manipulation of the robot; determine a state difference between the current state and the target state; acquire from a learned model, a degree of distribution associated with a motion of the robot, based on the state difference, wherein the learned model is generated based on a past robot manipulation; set a level of assistance to be given during the manipulation of the robot by the subject user, based on the degree of distribution acquired; and generate an output command value for operating the robot, based on the input command value and the level of assistance.

DETAILED DESCRIPTION

In the following description, with reference to the drawings, the same reference numbers are assigned to the same components or to similar components having the same function, and overlapping description is omitted.

Configuration of system A robot control system 1 according to an example is a computer system that controls a robot 2 according to a manipulation of a user (or subject user). The robot 2 operates based on the manipulation and executes various operations such as machining and assembling. The user refers to a person who manipulates the robot, and thus may also be referred to as an operator.

Figure 1:
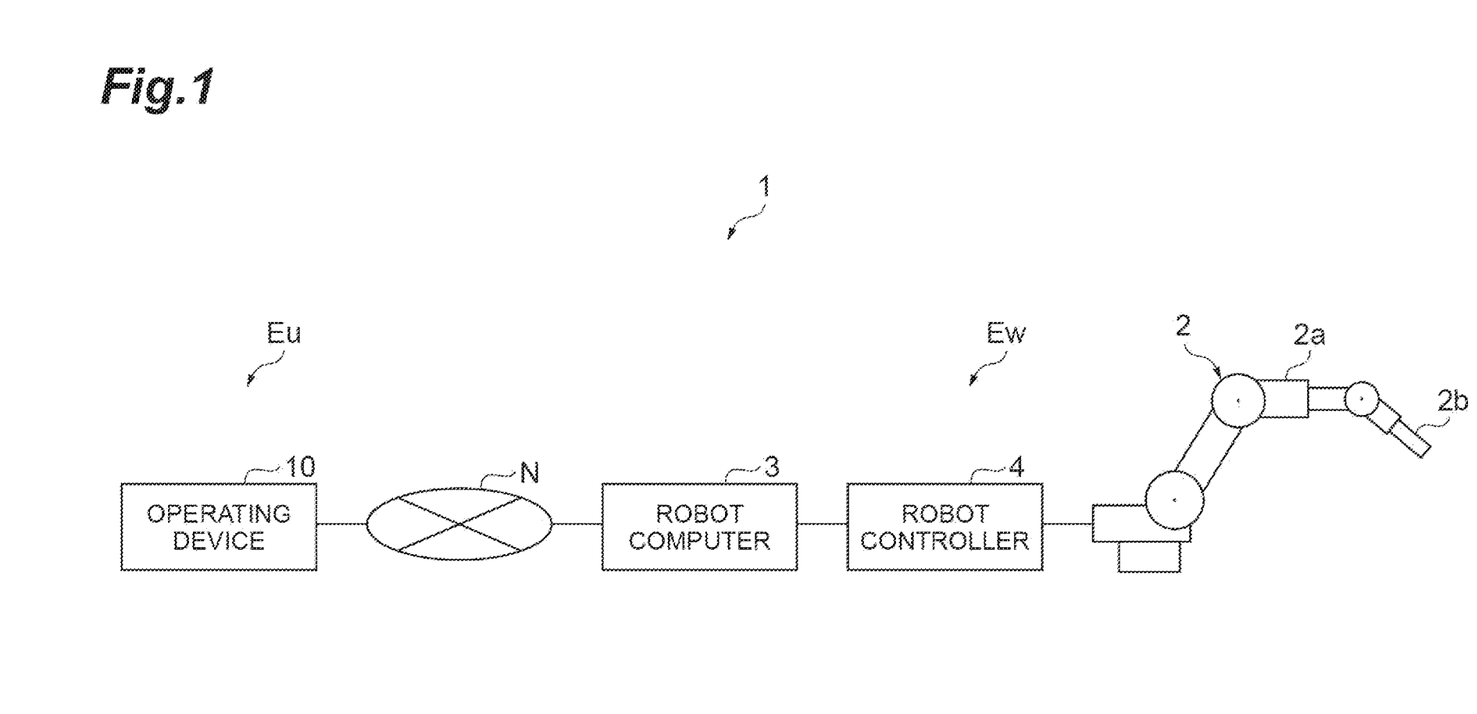
FIG. 1 is a diagram showing an example application of a robot control system.

FIG. 1 is a diagram showing an example application of the robot control system 1. In some examples, the robot control system 1 includes an operating device 10. The operating device 10 is connected to a robot computer 3 via a communication network N. The robot computer 3 is connected to a robot controller 4, and the robot controller 4 is connected to the robot 2.

FIG. 1 shows one operating device 10 and one robot 2. However, two or more operating devices 10 or two or more robots 2 may exist.

In some examples, the operating device 10 is located in an operating environment Eu where the user (or subject user) is located, while the robot computer 3, the robot controller 4, and the robot 2 are located in a working environment Ew that is remotely located with respect to the user. That is, when viewed from the operating environment Eu, the working environment Ew is a remote environment. The fact that a certain object is "located remotely" refers to that the object exists at a position where the user cannot confirm with his or her own eyes. The distance between the operating environment Eu and the working environment Ew, that is, the distance between the user and the robot 2 may be on the order of kilometers or on the order of several meters. In some examples, the space next to a room that is the operating environment Eu may be the working environment Ew.

Corresponding to the fact that the distance between the operating environment Eu and the working environment Ew are not limited, the configuration of the communication network N is also not limited. For example, the communication network N may include at least one of the Internet and an intranet. Alternatively, the communication network N may have a simple configuration realized by one communication cable.

The operating device 10 is a computer for manipulating the robot 2. In some examples, the operating device 10 includes a manipulation interface, which is an input interface for manipulating the robot 2, and a monitor capable of displaying an image depicting the working environment Ew. The user may manipulate the robot 2 with the manipulation interface while checking the working environment Ew displayed on the monitor. The operating device 10 transmits a command value indicating a user operation (or a manipulation by the user, or a command) input from the manipulation interface, to the robot computer 3. The command refers to an instruction input by a user operation. The command value refers to a value related to a command. The value related to the command is, for example, a value related to an additional movement vector corresponding to the user operation, that is, a value indicating an amount of movement or a movement speed, and a movement direction.

The robot computer 3 is a computer that interprets the command value input from the operating device 10 and outputs a command signal corresponding to the command value to the robot controller 4.

The robot controller 4 controls the robot 2 according to the command signal input from the robot computer 3. In other words, the robot controller 4 controls the robot 2 based on a command sent from the operating device 10 in response to the user operation. In some examples, the command signal includes data for controlling the robot 2, for example, a path indicating a trajectory of the robot 2. The trajectory of the robot 2 refers to a path of motion of the robot 2 or a component thereof. For example, the trajectory of the robot 2 may be a trajectory of a tip portion of the robot 2. In some examples, the robot controller 4 calculates a joint angle target value (or an angle target value of each joint of the robot 2) for matching a position and posture of the tip portion with the target value indicated by the command signal, and controls the robot 2 in accordance with the angle target value.

The robot 2 is a device or machine that works on behalf of a person. In some examples, the robot 2 is a vertical articulated robot of a multi-axis serial link type. The robot 2 includes a manipulator 2a and an end effector 2b which is a tool attached to the tip of the manipulator 2a. The robot 2 is capable of executing various processes with the end effector 2b. The robot 2 may freely change a position and posture of the end effector 2b within a predetermined range. The robot 2 may be a six-axis vertical articulated robot, or a seven-axis vertical articulated robot in which one redundant axis is added to six axes.

The motion or state of the robot 2 is recorded as a response of the robot 2 by various sensors, and is output to, for example, the robot controller 4 as sensor data. The response refers to an output with respect to a command, and may be the motion or state of the robot 2 with respect to the command. The motion or state may be represented by any data item, for example by at least one of position, posture, velocity, acceleration, torque, force, and current value. The motion or state of the robot 2 may be represented by the motion or state of the end effector 2b.

The response may be information indicating the motion or state of the robot 2, or may be indicated by an instruction output from the robot controller 4 to the robot 2. The sensor may be mounted on the robot 2, or may be provided independently of the robot 2 without being mounted on the robot 2. In some examples, various sensors such as an acceleration sensor, a voltage sensor, a current sensor, a temperature sensor, a gyro sensor, a camera, a pressure sensor, and a time-of-flight (ToF) sensor may be used.

The robot controller 4 calculates a response value indicating the motion or state (i.e., the response) of the robot 2 based on the sensor data, and transmits the response value to the operating device 10 via the robot computer 3. The response value refers to a value related to a response. The value related to the response is, for example, a value related to an additional movement vector indicating additional motion of the robot, that is, a value indicating an amount of movement or a movement speed, and a movement direction. The robot controller 4 may transmit a command signal for the robot 2 to the operating device 10 via the robot computer 3, as a response value. At least part of the sensor data from the sensor of the robot 2 may be output to the robot computer 3 without going through the robot controller 4. In this case, the robot computer 3 may calculate the response value based on the sensor data.

Depending on a skill of the user or a situation of the working environment Ew, the user may not be able to manipulate the robot 2 as intended. For example, in a case where an image showing the working environment Ew is unclear or a delay occurs between the user operation and the motion of the robot 2 shown in the image, the user may not sufficiently obtain the information of the working environment Ew and thus may not accurately manipulate the robot 2. Here, the delay indicates that the motion or state of the robot 2 shown in an image is delayed with respect to a command to the robot 2. Alternatively, in a case where the user is unfamiliar with the manipulation of the robot 2, the user may not be able to manipulate the robot 2 accurately or efficiently. The robot control system 1 assists the manipulation of the robot 2 by such users, thereby enabling the user to manipulate the robot 2 as he or she intended. The "assisting a manipulation of a robot" or "assisting a user operation" refers to providing a user with an environment for appropriately (for example, accurately) operating the robot 2.

The robot control system 1 uses a machine learning model for the assistance. The machine learning refers to a method of autonomously finding a law or rule by repeatedly performing learning based on predetermined information. The machine learning model refers to a calculation model used in the machine learning. The machine learning model may be constructed using algorithms and data structures. Various algorithms may be used for the machine learning model. In some examples, the robot control system 1 uses a machine learning model capable of obtaining a probability distribution of a function that predicts an output from an input. For example, the machine learning model may be constructed using a Gaussian process. The Gaussian process refers to a non-dimensional Gaussian distribution. The Gaussian process is characterized by the mean and variance of the Gaussian distribution. In the present example, it is assumed that the robot control system 1 uses a machine learning model based on the Gaussian process.

An autonomously generated machine learning model is referred to as a "learned model". It should be noted that the learned model is a calculation model estimated to be optimal for assisting the manipulation of the robot 2, and is not necessarily a "calculation model that is optimal in reality". The process of generating the learned model corresponds to a learning phase. In the learning phase, a predetermined computer system performs the machine learning based on one or more past manipulations (or past robot manipulations) to generate a learned model. The robot control system 1 uses the learned model to assist the manipulation of the robot 2. This assistance corresponds to an operation phase.

The learned model is portable between computer systems. Thus, a learned model generated in one computer system can be used in another computer system. As a matter of course, a single computer system may perform both generation and utilization of the learned model. The robot control system 1 may execute both the learning phase and the operation phase. Alternatively, the robot control system 1 may execute the operation phase using a learned model generated by another computer system without executing the learning phase.

Various computers may function as the operating device 10 or the robot computer 3. In some examples, these computers may be configured by personal computers or large computers such as business servers.

Figure 2:
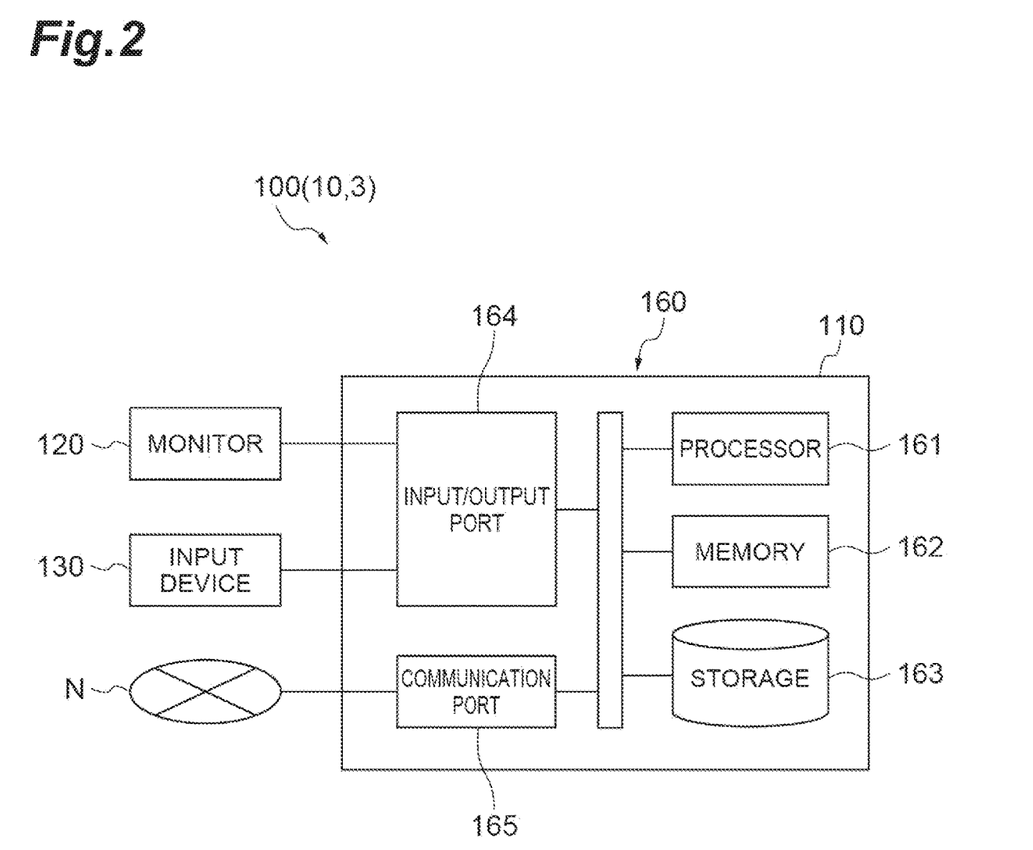
FIG. 2 is a diagram showing an example hardware configuration used for the robot control system.

FIG. 2 is a diagram showing an example hardware configuration of a computer 100 used for the operating device 10 or the robot computer 3. In this example, the computer 100 comprise a main body 110, a monitor 120, and an input device 130.

The main body 110 may be realized by at least one computer. The main body 110 includes circuitry 160, and the circuitry 160 includes at least one a processor 161, a memory 162, a storage 163, an input/output port 164, and a communication port 165. The storage 163 stores a program for configuring each functional module of the main body 110. The storage 163 is a computer-readable recording medium such as a hard disk, a non-volatile semiconductor memory, a magnetic disk, or an optical disk. The memory 162 temporarily stores a program loaded from the storage 163, calculation results of the processor 161, and the like. The processor 161 configures each functional module by executing a program in cooperation with the memory 162. The input/output port 164 inputs and outputs electric signals to and from the monitor 120 or the input device 130 in response to commands from the processor 161. The input/output port 164 may input and output electric signals to and from another device such as the robot controller 4. The communication port 165 performs data communication with another device via the communication network N in accordance with instructions from the processor 161.

The monitor 120 is a device for displaying information output from the main body 110. The monitor 120 is an example of the display unit in the present disclosure. The monitor 120 may be any device as long as graphic display is possible, such as a liquid crystal panel. The input device 130 is a device for inputting information to the main body 110. The input device 130 may be any device to which the suitable information can be input, and examples thereof include a manipulation interface such as a keypad, a mouse, and a manipulation controller.

The monitor 120 and the input device 130 may be integrated as a touch panel. For example, the main body 110, the monitor 120, and the input device 130 may be integrated, like a tablet computer.

Figure 3:
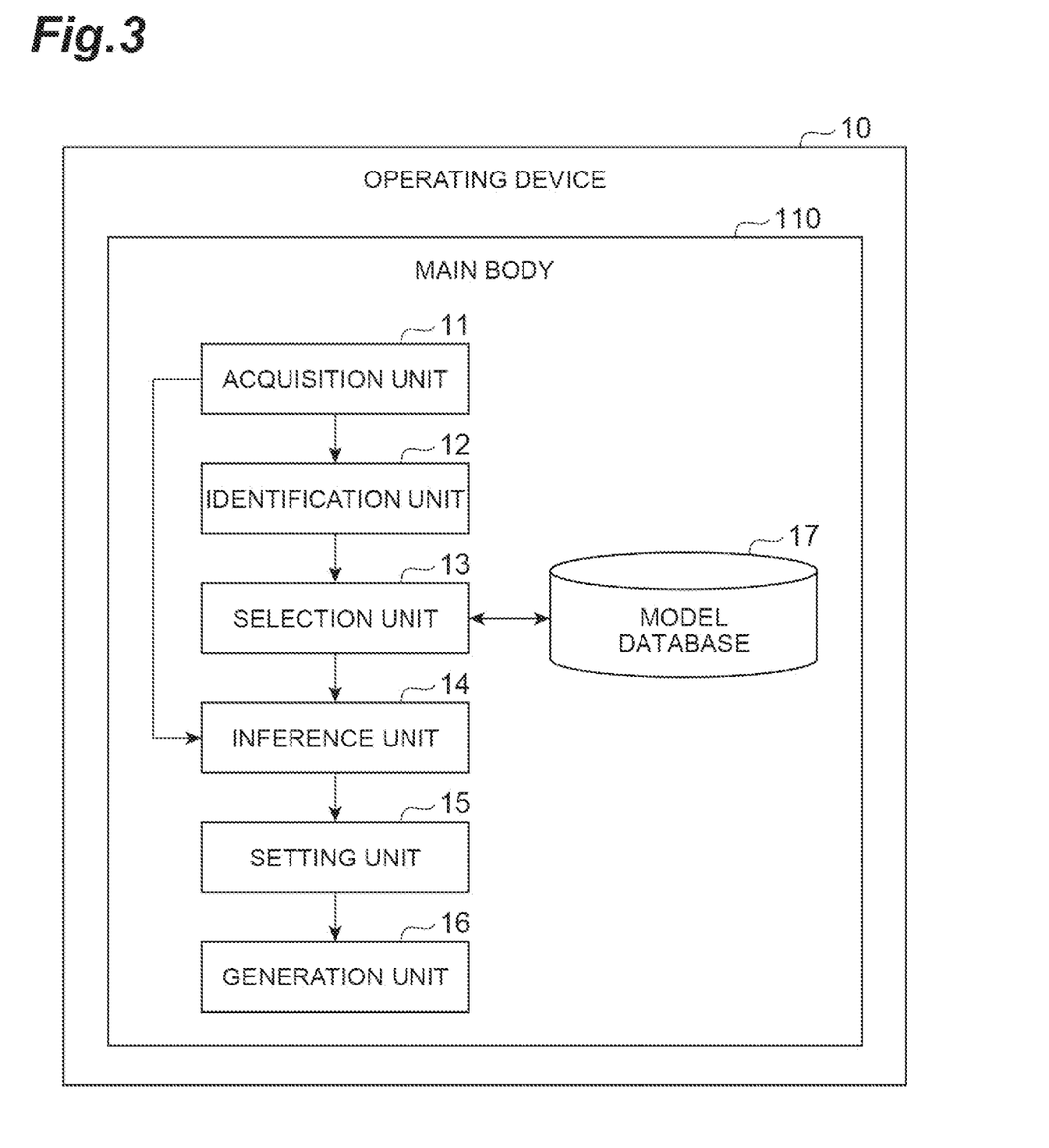
FIG. 3 is a diagram showing functional modules of an example operating device.

FIG. 3 is a diagram showing an example functional configuration of the operating device 10. In some examples, the operating device 10 includes an acquisition unit 11, an identification unit 12, a selection unit 13, an inference unit 14, a setting unit 15, and a generation unit 16 as functional modules. In some examples, the operating device 10 further includes a model database 17.

The acquisition unit 11 is a functional module that acquires from the operating environment Eu or the working environment Ew data related to a command or response of the robot 2. For example, the acquisition unit 11 acquires a command value and a response value (or sensor data).

The identification unit 12 is a functional module that identifies a task to be executed by the robot 2 based on a response value (sensor data). The task refers to a unit of a processing carried out by the robot 2. The identification unit 12 further identifies a user that manipulates the robot 2.

The selection unit 13 is a functional module that selects a learned model corresponding to the identified task from a plurality of learned models corresponding to a plurality of tasks executable by the robot 2. The selection unit 13 accesses the model database 17 that stores a plurality of predetermined learned models to select the learned model corresponding to the task.

In advance, each learned model is generated by the machine learning using training data and stored in the model database 17. Various methods may be used to generate the learned model. In some examples, in a case where the machine learning model based on the Gaussian process is learned, hyperparameters are optimized so as to minimize an error defined by using a hyperparameter of a covariance function and a noise of an observed value. In the machine learning by the Gaussian process, since the learned model can be constructed from a relatively low amount of training data, it is possible to reduce effort to collect the training data.

The inference unit 14 is a functional module that outputs a degree of distribution associated with a motion of the robot 2 in a state difference between a current state of the robot 2 and a target state, based on the selected learned model. The current state refers to a current state of the robot 2 derived from the response value. The target state refers to a final state of the robot 2 intended by the user, for example, a state of the robot 2 when the operation intended by the user is completed. The target state may be associated with the manipulation of the robot 2. The state difference refers to a difference between the current state and the target state, and corresponds to the remaining motion required until the robot 2 reaches the target state. The degree of distribution is represented by a probability variable (e.g., variance) output from the learned model. In some examples, the learned model outputs (or calculates) the degree of distribution based on the Gaussian process. For example, the degree of distribution is a variance calculated based on the Gaussian process.

The setting unit 15 is a functional module that sets a level of assistance (or degree of assistance), which is a degree (or amount of assistance) for assisting the manipulation of the robot 2, based on the degree of distribution.

The generation unit 16 is a functional module that generates an output command value to be output to the robot 2, based on an input command value input from the operating device 10 by a user operation and the set level of assistance. The output command value is used for operating the robot 2.

In the example of FIG. 3, the model database 17 is constructed in the operating device 10, but the model database 17 may be installed in another computer. For example, the model database 17 may be built on a separate computer from the operating device 10, and in this case the selection unit 13 accesses the model database 17 via a predetermined communication network.

Figure 4:
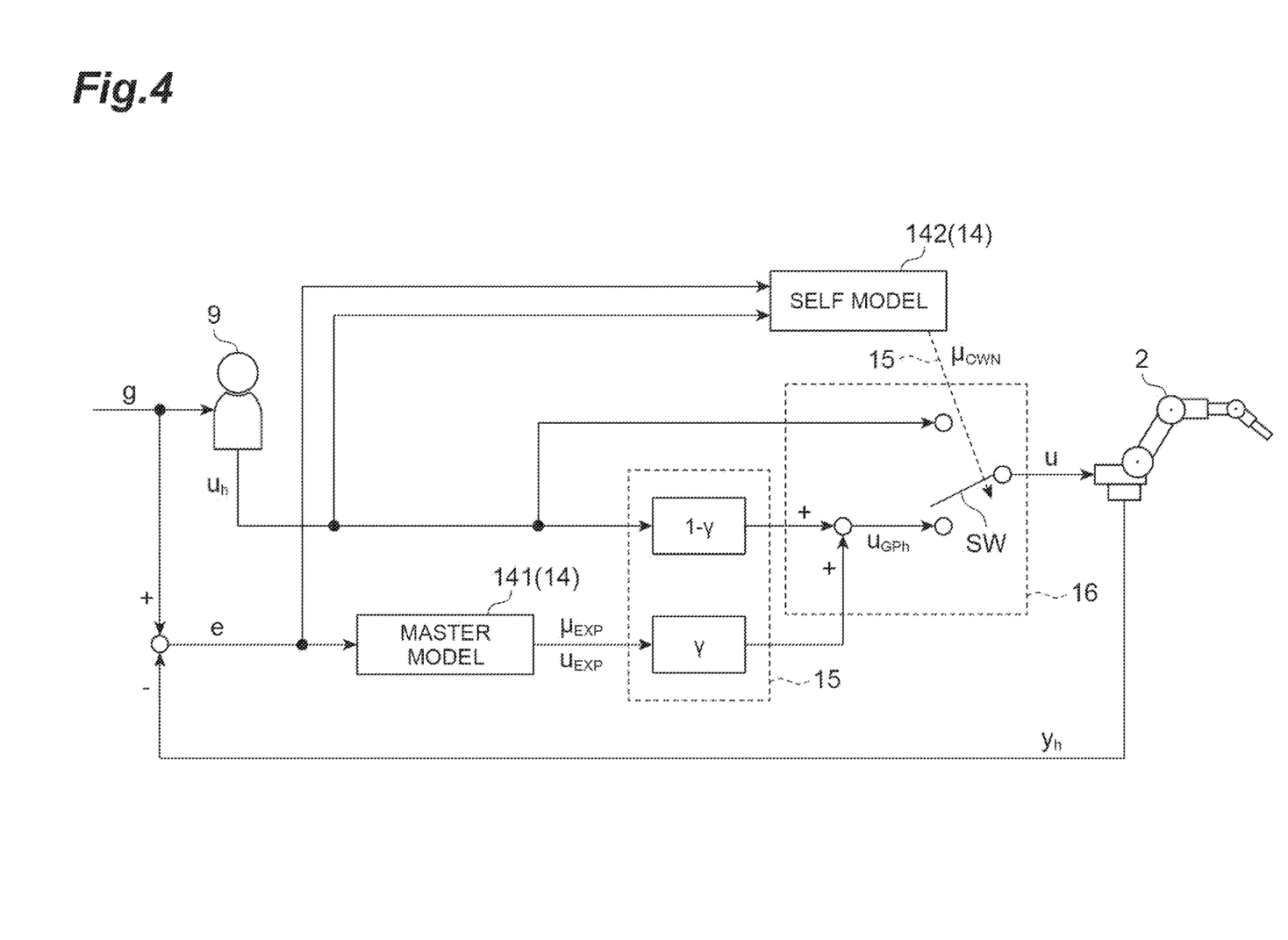
FIG. 4 is a block diagram showing an example functional configuration of the operating device.

FIG. 4 is a block diagram showing an example functional configuration of the operating device 10. The operating device 10 obtains the input command value $u_h$ from the manipulation controller that has received the manipulation of a user (or subject user) 9 aiming at a target state g of the robot 2. The input command value $u_h$ may be referred to as an original command value indicating the user operation itself. Also, the operating device 10 acquires a current state $y_h$ of the robot 2 and calculates (or determines) a state difference e of the current state $y_h$ and the target state g. The operating device 10 generates an output command value u based on the input command value $u_h$ and the state difference e, and transmits the output command value u to the robot 2. In some examples, the operating device 10 generates one of two candidates, which are the input command value $u_h$ itself and an assistance command value $u_{GPh}$ considering experience of an expert, as the output command value u, and transmits the output command value u. In FIG. 4, this process is represented by a switch SW.

In some examples, the operating device 10 includes two types of learned models, which is a master model (first model or expert model) 141 and a self model (second model or user-specific model) 142, as the inference unit 14, and generates the output command value u using these learned models.

The master model 141 is an example of a learned model generated based on a past manipulation of another user different from the user 9. In some examples, the master model 141 is a learned model generated based on a past manipulation of an expert who is more skilled in manipulation than the user 9. In some examples, the master model 141 receives the state difference e as an input and outputs variance (a first degree of distribution) $\mu_{EXP}$ and a predicted command value $u_{EXP}$. The variance (the first degree of distribution) $\mu_{EXP}$ indicates a degree of certainty of the manipulation by the expert in the state difference e. The predicted command value $u_{EXP}$ is a command value predicted based on the past manipulation, for example, a command value predicted based on the past manipulation by the expert.

On the other hand, the self model 142 is a learned model generated based on a past manipulation by the user 9. In some examples, the self model 142 receives the input command value $u_h$ and the state difference e as inputs and outputs variance (a second degree of distribution) $\mu_{OWN}$. The variance (the second degree of distribution) $\mu_{OWN}$ indicates a similarity to the past manipulation by the user 9 in the state difference e.

The setting unit 15 sets the level of assistance based on the degree of distribution. In some examples, the setting unit 15 may set a first level of assistance γ based on the variance (the first degree of distribution) $\mu_{EXP}$. The setting unit 15 further sets a second level of assistance based on the variance (the second degree of distribution) $\mu_{OWN}$. The second level of assistance is an indicator for determining the switching of the switch SW. That is, the second level of assistance is used to determine which of the input command value $u_h$ and the assistance command value $u_{GPh}$ is adopted as the output command value u.

The generation unit 16 generates one of the input command value $u_h$ and the assistance command value $u_{GPh}$ as the output command value u based on at least one of the input command value $u_h$, the first level of assistance γ, the second level of assistance, and the predicted command value $u_{EXP}$.

Robot Control Method

Figure 5:
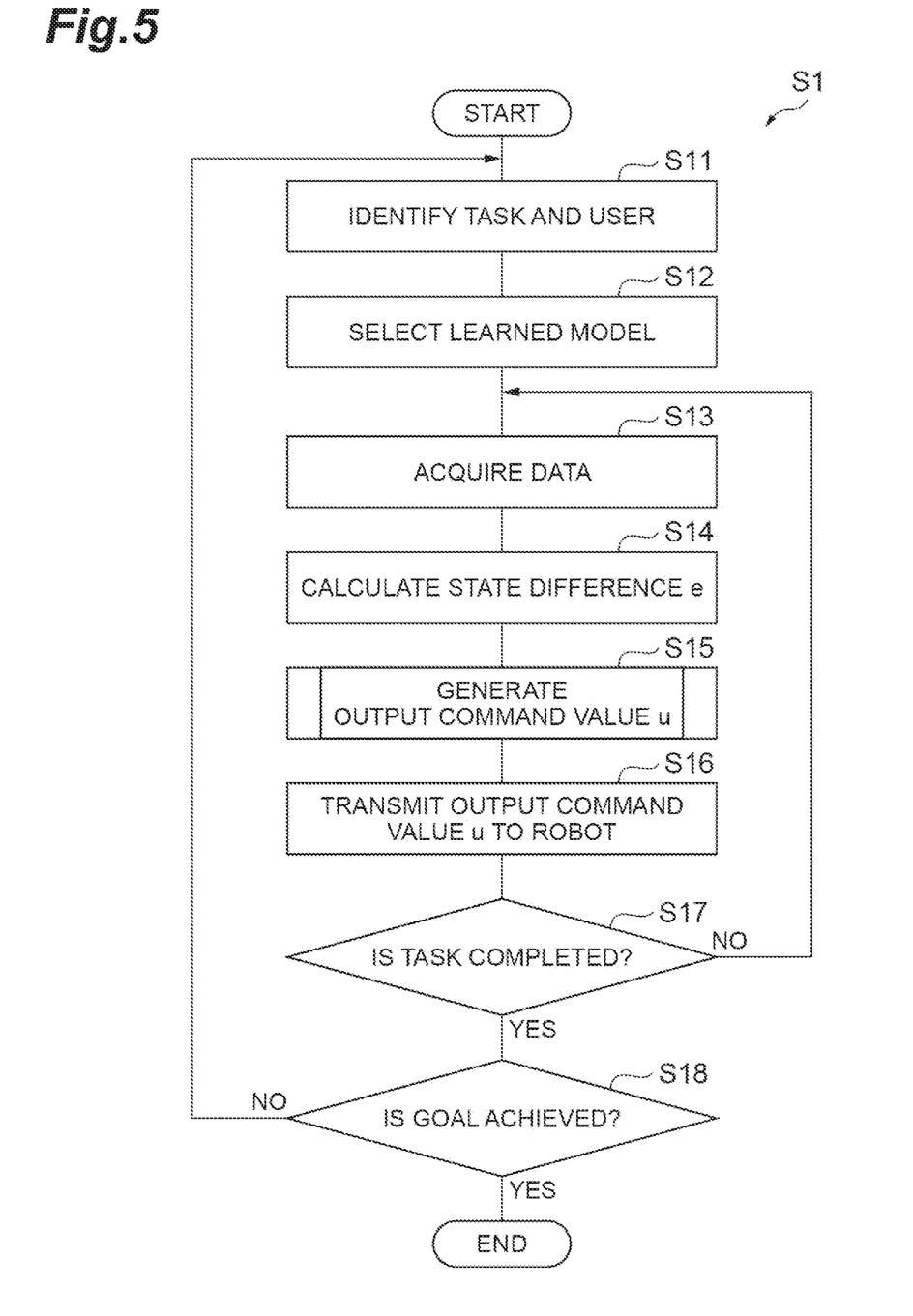
FIG. 5 is a flowchart showing an example operation of the robot control system.

As an example of the robot control method according to the present disclosure, an example of a series of processing executed by the robot control system 1 will be described with reference to FIG. 5. FIG. 5 is a flowchart showing an example operation of the robot control system 1 as a processing flow S1. That is, the robot control system 1 executes the processing flow S1.

In step S11, the identification unit 12 identifies a task and a user. In some examples, the identification unit 12 identifies the task based on a response value (sensor data) acquired by the acquisition unit 11. For example, the identification unit 12 may identify a current task based on a preset work and a history of response values. The identification unit 12 further identifies the user. For example, the identification unit 12 may identify the user by referring to a user ID input prior to the user operation.

In step S12, the selection unit 13 selects the learned model based on the identified task. The selection unit 13 accesses the model database 17 to select one self model from a plurality of predetermined self models and to select one master model from a plurality of predetermined master models. In some examples, the selection unit 13 selects one self model corresponding to a combination of the identified user and task, and selects one master model corresponding to the identified task.

Figure 6:
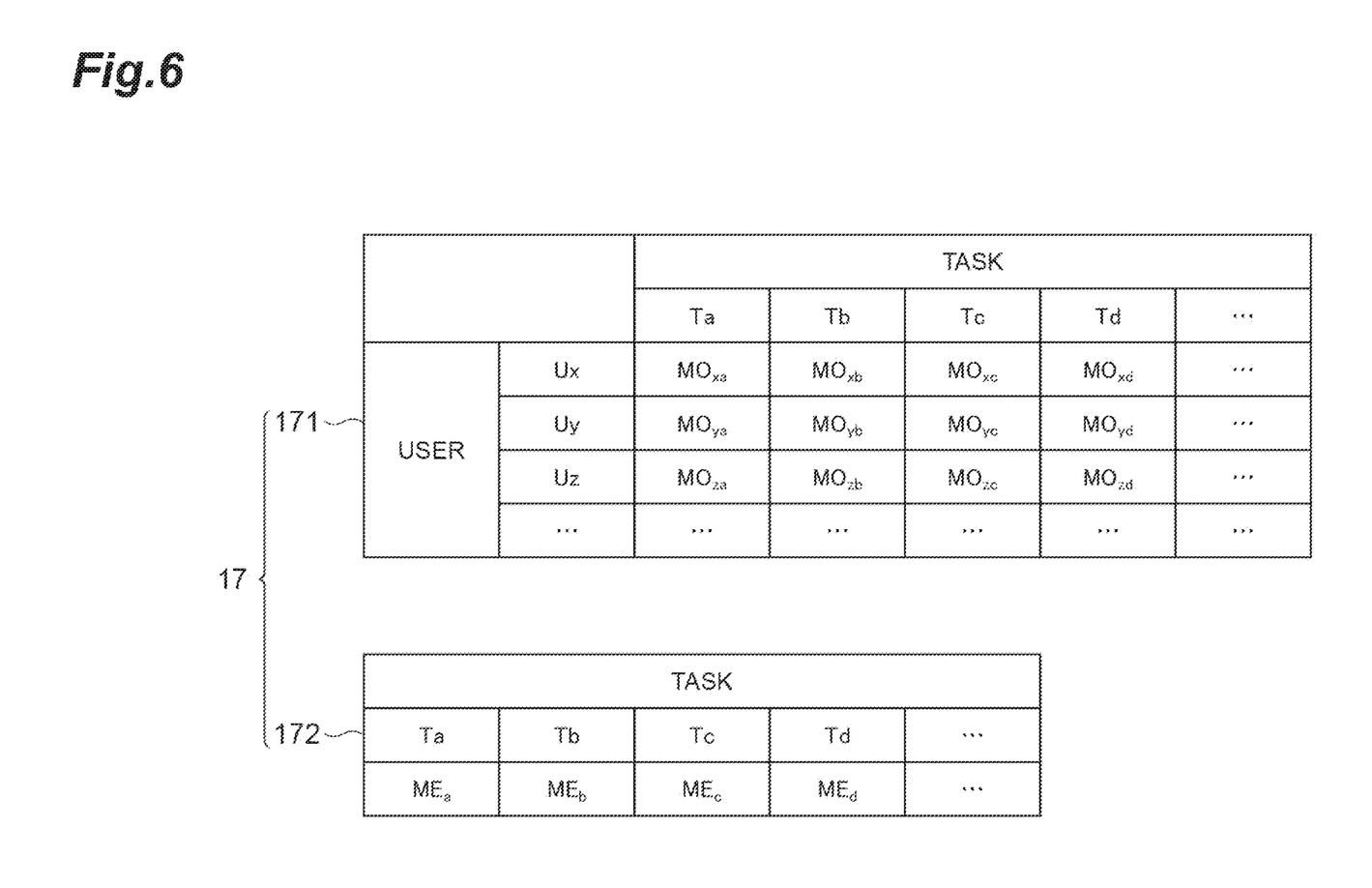
FIG. 6 is a diagram showing an example learned model stored in a model database.

FIG. 6 is a diagram schematically showing an example learned model stored in the model database 17. In some examples, the model database 17 stores (m×n) self models 171 corresponding to a combination of m users and n tasks, and n master models 172 corresponding to the n tasks. On the premise of the example of FIG. 6, in a case where the user Uy and the task Tc are identified, the selection unit 13 selects self model $MO_{yc}$ from a plurality of self models 171 and selects the master model $ME_c$ from a plurality of the master models 172.

Referring back to FIG. 5, in step S13, the acquisition unit 11 acquires data for generating an output command value u. In some examples, the acquisition unit 11 acquires an input command value $u_h$ received by the manipulation controller and a response value (sensor data) transmitted from the working environment Ew.

In step S14, the acquisition unit 11 calculates (or determines) a state difference e. The acquisition unit 11 acquires a current state $y_h$ based on the response value (sensor data), and acquires a difference between the current state $y_h$ and a preset target state g as the state difference e.

Figure 7:
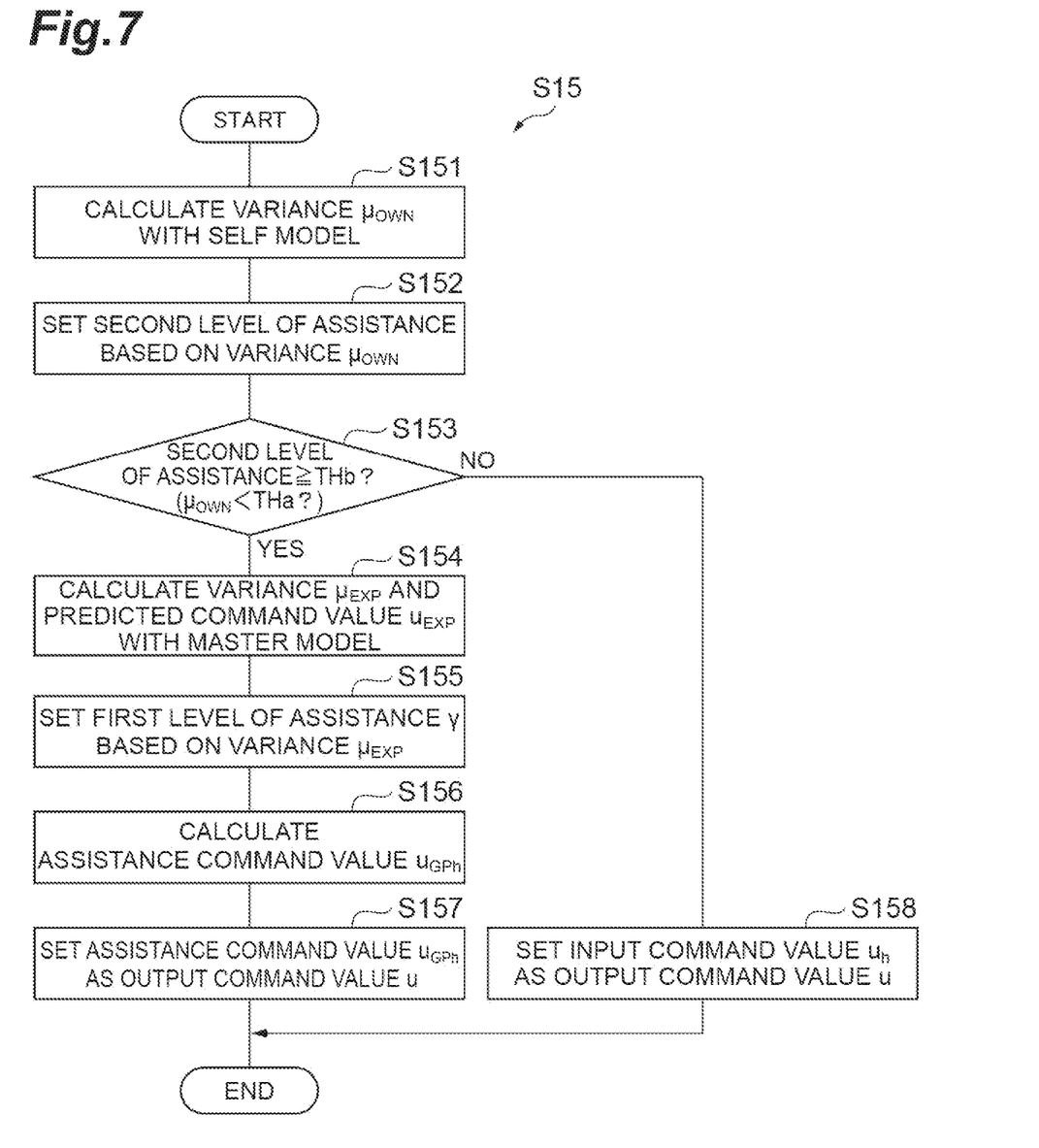
FIG. 7 is a flowchart showing an example processing of generating an output command value.

In step S15, the inference unit 14, the setting unit 15, and the generation unit 16 cooperate to generate an output command value u. An example of the generation process will be described with reference to FIG. 7. FIG. 7 is a flowchart showing an example processing of generating the output command value.

In step S151, the inference unit 14 calculates variance (the second degree of distribution) $\mu_{OWN}$ with the self model 142. The inference unit 14 inputs the input command value $u_h$ and the state difference e into the selected self model 142 and obtains the variance $\mu_{OWN}$ output from the self model 142.

In step S152, the setting unit 15 sets the second level of assistance based on the variance $\mu_{OWN}$. The second level of assistance may be set by various methods. In some examples, the setting unit 15 may set the second level of assistance such that the second level of assistance increases as the variance $\mu_{OWN}$ decreases. A lower variance $\mu_{OWN}$ indicates that the user operation in the state difference e is within a normal range. Therefore, it may be considered suitable to assist the user operation in a case where the variance $\mu_{OWN}$ is relatively low. On the other hand, a higher variance $\mu_{OWN}$ indicates that the user operation in the state difference e is relatively largely different from the normal operation. Therefore, in a case where the variance $\mu_{OWN}$ is relatively high, it may be considered suitable not to intervene in the user operation (to respect the user operation as it is) or to reduce the degree of the intervention, with the determination that the user operation is based on a special situation (for example, a special urgent manipulation). In some examples, based on such a design concept, the setting unit 15 sets the second level of assistance such that the second level of assistance increases as the variance $\mu_{OWN}$ decreases. The setting unit 15 may set the second level of assistance to "1" in a case where the variance $\mu_{OWN}$ is less than a predetermined threshold THa, and may set the second level of assistance to "0" in a case where the variance $\mu_{OWN}$ is equal to or greater than the threshold THa. Therefore, the second level of assistance may be represented by a binary value. Alternatively, the setting unit 15 may set the second level of assistance to any value within a predetermined numerical range, and thus the second level of assistance may be represented by a continuous value.

In step S153, the setting unit 15 compares the second level of assistance to a predetermined threshold THb. In a case where the second level of assistance is equal to or greater than the threshold THb (YES in step S153), the processing proceeds to step S154. In a case where the second level of assistance is represented by a binary value of "0" or "1", the threshold THb may be "1". Viewing the branch process from a viewpoint of the variance $\mu_{OWN}$, the processing proceeds to step S154 in a case where the variance $\mu_{OWN}$ is less than threshold THa.

In step S154, the inference unit 14 calculates variance (the first degree of distribution) $\mu_{EXP}$ and a predicted command value $u_{EXP}$ with the master model 141. The inference unit 14 inputs the state difference e to the selected master model 141, and obtains the variance $\mu_{EXP}$ and the predicted command value $u_{EXP}$ output from the master model.

In step S155, the setting unit 15 sets the first level of assistance $\gamma$ based on the variance $\mu_{EXP}$. The first level of assistance $\gamma$ may be set by any method. In some examples, the setting unit 15 may set the first level of assistance $\gamma$ such that the first level of assistance $\gamma$ increases as the variance $\mu_{EXP}$ decreases. A lower variance $\mu_{EXP}$ indicates that the variation of experts' manipulation in the state difference e is relatively low. This indicates that, empirically, many experts perform the same or similar manipulation in the state difference e. Therefore, in a case where the variance $\mu_{EXP}$ is low, it can be considered suitable to increase the first level of assistance $\gamma$ to actively involve the user operation. On the other hand, a higher variance $\mu_{EXP}$ indicates that the variation of experts' manipulation in the state difference e is relatively high. Therefore, in a case where the variance $\mu_{EXP}$ is high, it can be considered suitable to decrease the first level of assistance $\gamma$ to suppress the involvement in the user operation. In some examples, based on such a design concept, the setting unit 15 sets the first level of assistance $\gamma$ such that the first level of assistance $\gamma$ increases as the variance $\mu_{EXP}$ decreases.

In step S156, the generation unit 16 calculates the assistance command value $u_{GPh}$. The generation unit 16 combines the input command value $u_h$ and the predicted command value $u_{EXP}$ at a ratio corresponding to the first level of assistance $\gamma$ to calculate the assistance command value (or combined command value) $u_{GPh}$. Namely, the input command value $u_h$ and the predicted command value $u_{EXP}$ are combined by calculating weighted values of the input command value $u_h$ and of the predicted command value $u_{EXP}$ according to respective weights that are set to the ratio associated with the first level of assistance $\gamma$, and adding the weighted values to obtain the assistance command value (or combined command value) $u_{GPh}$, so that the output command value may be generated based on the assistance command value $u_{GPh}$. In some examples, the generation unit 16 implements the combination by the following Equation (1). Assuming that $(1-\gamma)$ in the Equation (1) is referred to as a degree of non-assistance, the generation unit 16 calculates a sum of a product of the predicted command value $u_{EXP}$ and the first level of assistance $\gamma$ and a product of the input command value $u_h$ and the degree of non-stance, as the assistance command value $u_{GPh}$. As shown in the Equation (1), the first level of assistance $\gamma$ may be used as the ratio as it is. Alternatively, the generation unit 16 may set the ratio in any method based on the first level of assistance $\gamma$.

$$u_{GPh} = (1-\gamma)u_h + \gamma u_{EXP} \qquad (1)$$

In step S157, the generation unit 16 sets the assistance command value $u_{GPh}$ as the output command value u. That is, the generation unit 16 combines the input command value $u_h$ and the predicted command value $u_{EXP}$ at the ratio corresponding to the first level of assistance $\gamma$ and generates the output command value u, in steps S156 and S157.

On the other hand, in a case where the second level of assistance is less than the threshold THb in step S153 (NO in step S153), the processing proceeds to step S158. Viewing this process from the viewpoint of the variance $\mu_{OWN}$, in a case where the variance $\mu_{OWN}$ is equal to or greater than threshold THa, the processing proceeds to step S158. In step S158, the generation unit 16 sets (or generates) the input command value $u_h$ as it is, as the output command value u.

As shown in FIG. 7, in some examples, in a case where the second level of assistance is equal to or greater than the threshold THb (YES in step S153), the generation unit 16 generates the output command value u based on the input command value $u_h$, the first level of assistance $\gamma$, and the predicted command value $u_{EXP}$. On the other hand, in a case where the second level of assistance is less than the threshold THb (NO in step S153), the generation unit 16 generates the output command value u based on the input command value $u_h$ without using the first level of assistance $\gamma$ and the predicted command value $u_{EXP}$. The conditional branching in step S153 corresponds to switching of the switch SW. In other words, in a case where the variance (the second degree of distribution) $\mu_{OWN}$ is less than the threshold THa, the generation unit 16 generates the output command value u based on the input command value $u_h$, the first level of assistance $\gamma$, and the predicted command value $u_{EXP}$. In a case where the variance $\mu_{OWN}$ is greater than or equal to the threshold THa, the generation unit 16 generates the output command value u based on the input command value $u_h$ without using the first level of assistance $\gamma$ and the predicted command value $u_{EXP}$.

Referring back to FIG. 5, in step S16, the generation unit 16 transmits the output command value u to the robot 2. The robot 2 operates based on the output command value u.

As indicated by step S17, the processing of steps S13 to S16 is repeated for one task until the task is completed. As indicated by step S18, the processing of steps S11 to S17 is repeated until the goal of the user operation is achieved, that is, until the robot 2 reaches the target state g.

By the processing flow S1, the robot control system 1 controls the robot 2 as follows. That is, in a case where the input command value $u_h$ is close to normal manipulations by the user and manipulations by the expert(s) does not vary, the robot control system 1 actively assists the user operation. This strong assistance makes it possible to operate the robot 2 more efficiently and cause the robot 2 to reach the target state in a shorter time. In a case where the input command value $u_h$ is close to the normal manipulations by the user and the manipulations by the expert(s) varies, the robot control system 1 reduces the level of assistance to the user operation. By this passive assistance, it is possible to operate the robot 2 while respecting the user operation to some extent. In a case where the input command value $u_h$ is different from the normal manipulations by the user, since the input command value $u_h$ is output to the robot 2 as it is, the user operation can be reflected on the robot 2 as it is. In this manner, the robot control system 1 provides an environment as if multiple users (e.g., the user and expert) work together to manipulate the robot 2.

Program

Each functional module of the operating device 10 is implemented by reading a robot control program on the processor 161 or the memory 162 and causing the processor 161 to execute the program. The robot control program includes code for implementing each functional module of the operating device 10. The processor 161 operates the input/output port 164 or the communication port 165 according to the robot control program, and executes reading and writing of data in the memory 162 or storage 163. Such processing realizes each functional module of the operating device 10.

The robot control program may be provided after being fixedly recorded in a non-transitory recording medium such as a CD-ROM, a DVD-ROM, or a semiconductor memory. Alternatively, the robot control program may be provided via a communication network as data signals superimposed on a carrier wave.

As described above, a robot control system according to an aspect of the present disclosure includes circuitry configured to: acquire an input command value indicating a manipulation of a robot by a subject user; acquire a current state of the robot and a target state associated with the manipulation of the robot; determine a state difference between the current state and the target state; acquire from a learned model, a degree of distribution associated with a motion of the robot, based on the state difference, wherein the learned model is generated based on a past robot manipulation; set a level of assistance to be given during the manipulation of the robot by the subject user, based on the degree of distribution acquired; and generate an output command value for operating the robot, based on the input command value and the level of assistance.

A robot control method according to an aspect of the present disclosure is executable by a robot control system including at least one processor. The method includes: acquiring an input command value indicating a manipulation of a robot by a subject user; acquiring a current state of the robot and a target state associated with the manipulation of the robot; determining a state difference between the current state and the target state; acquiring from a learned model, a degree of distribution associated with a motion of the robot, based on the state difference, wherein the learned model is generated based on a past robot manipulation; setting a level of assistance to be given during the manipulation of the robot by the subject user, based on the degree of distribution acquired; and generating an output command value for operating the robot, based on the input command value and the level of assistance.

Anon-transitory computer-readable storage medium according to an aspect of the present disclosure stores processor-executable instructions to: acquire an input command value indicating a manipulation of a robot by a subject user; acquire a current state of the robot and a target state associated with the manipulation of the robot; determine a state difference between the current state and the target state; acquire from a learned model, a degree of distribution associated with a motion of the robot, based on the state difference, wherein the learned model is generated based on a past robot manipulation; set a level of assistance to be given during the manipulation of the robot by the subject user, based on the degree of distribution acquired; and generate an output command value for operating the robot, based on the input command value and the level of assistance.

In these aspects, the input command value is assisted by the learned model in consideration of the past robot manipulation, and a more appropriate command value is output to the robot as the output command value. This mechanism enables the manipulation of the robot to be appropriately assisted.

In some examples, the circuitry may be further configured to acquire from the learned model, a predicted command value which is predicted based on the past robot manipulation, and the output command value may be generated based further on the predicted command value. Since the output command value is generated by further considering the predicted command value based on the past robot manipulation, a more appropriate command can be transmitted to the robot.

In some examples, the circuitry may be further configured to: calculate weighted values of the input command value and of the predicted command value according to respective weights associated with the level of assistance; add the weighted values to obtain a combined command value; and generate the output command value based on the combined command value. By combining both a current manipulation of the subject user and the past robot manipulation by using the level of assistance, a more appropriate command can be transmitted to the robot.

In some examples, the circuitry may be further configured to: identify a task to be executed by the robot; and select the learned model from a plurality of learned models corresponding to a plurality of tasks executable by the robot, based on the task identified. By using the learned model according to the task, the manipulation of the robot can be assisted appropriately according to each task.

In some examples, the task to be executed by the robot may be identified based on sensor data indicating a response of the robot to the input command value. This mechanism enables the learned model to be automatically selected using the sensor data.

In some examples, the degree of distribution may be a variance calculated. By adopting the Gaussian process, the learned model can be obtained even in a case where the amount of training data is relatively low, and thus the learned model can be prepared more easily.

In some examples, the learned model may be generated based on a past manipulation by another user different from the subject user. By setting the level of assistance based on the manipulation of the other user, the manipulation of the robot can be appropriately assisted.

In some examples, the degree of distribution may indicate a degree of certainty of manipulation by the other user that is associated with the state difference.

In some examples, the level of assistance may be set to increase in response to a decrease in the degree of distribution.

In some examples, the learned model may include a first model generated based on the past manipulation by the other user, the other user having a greater skill level in robot manipulation than the subject user, and a second model generated based on a past manipulation by the subject user. Since this mechanism obtains the output command value reflecting the skill of the expert appropriately, it is possible to more appropriately assist the manipulation of the robot.

In some examples, the degree of distribution may include a first degree of distribution acquired from the first model and a second degree of distribution acquired from the second model, the level of assistance may include a first level of assistance that is set based on the first degree of distribution, and a second level of assistance that is set based on the second degree of distribution, and the output command value may be generated based on the input command value, the first level of assistance, and the second level of assistance.

In some examples, the second degree of distribution may indicate a degree of similarity between the manipulation indicated by the input command value and the past manipulation by the subject user that is associated with the state difference. Since the output command value is generated by further considering the similarity between the current manipulation and the past manipulation of the subject user, a more appropriate command can be transmitted to the robot.

In some examples, the second level of assistance may be set to increase in response to a decrease in the second degree of distribution.

In some examples, the output command value may be generated based on a comparison of the second level of assistance with a threshold.

In some examples, the circuitry may be further configured to: acquire from the first model, a predicted command value which is predicted based on the past manipulation by the other user; calculate weighted values of the input command value and of the predicted command value according to respective weights associated with the first level of assistance; and add the weighted values to obtain a combined command value. The output command value may be generated based on the combined command value, in response to the second level of assistance being equal to or greater than the threshold. By assisting the manipulation only in a case where the current manipulation seems to be normal, it is possible to assist in accordance with the situation of the manipulation of the robot.

In some examples, the output command value may be generated by setting the input command value as the output command value, in response to the second level of assistance being less than the threshold. By respecting the manipulation as it is in a case where the current manipulation seems to be different from normal, it is possible to assist in accordance with the situation of the manipulation of the robot.

In some examples, the robot control system may further include the robot.

In some examples, the robot control system may further include a manipulation controller configured to receive the manipulation by the subject user.

ADDITIONAL EXAMPLES

It is to be understood that not all aspects, advantages and features described herein may necessarily be achieved by, or included in, any one particular example. Indeed, having described and illustrated various examples herein, it should be apparent that other examples may be modified in arrangement and detail is omitted.

The robot control system may include another configuration different from the above examples. For example, instead of the operating device 10, the robot computer 3 may include the acquisition unit 11, the identification unit 12, the selection unit 13, the inference unit 14, the setting unit 15, the generation unit 16, and the model database 17. Although the operating device 10 includes the acquisition unit 11, the identification unit 12, and the selection unit 13 in the above examples, at least one of these functional modules may be constructed on another computer.

In the above examples, the inference unit 14 includes the master model 141 and the self model 142, but the inference unit 14 may not include one of the two types of learned models. That is, the robot control system may assist the manipulation of the robot using either one of the master model (or first model) and the self model (or second model).

The robot computer 3 may be omitted, and in this case, the robot controller 4 may be more directly connected to the operating device 10 through the communication network N.

FIG. 1 shows a robot system including the robot 2 and the robot control system 1. FIG. 1 also shows a manipulation system including a manipulation controller or the operating device 10, and the robot control system 1. In some examples, the present disclosure may also be applied to the robot system and the manipulation system.

The hardware configuration of the system is not limited to an example in which each functional module is implemented by executing a program. For example, at least part of the functional modules in the above-described examples may be configured by logic circuitry specialized for the function(s), or may be configured by an application specific integrated circuit (ASIC) in which the logic circuitry is integrated.

A procedure of the method executed by at least one processor is not limited to the above examples. For example, some of the above-described steps (processes) may be omitted, or the steps may be executed in a different order. Furthermore, any two or more steps among the above-described steps may be combined, or part of the steps may be modified or deleted. Alternatively, other steps may be executed in addition to the steps described above.

In a case where a magnitude relationship between two numerical values is compared in a computer system or a computer, either of two criteria of "equal to or greater than" and "greater than" may be used, and either of two criteria of "equal to or less than" and "less than" may be used.

We claim all modifications and variations coining within the spirit and scope of the subject matter claimed herein.

Regarding the above examples, the following appendices are provided by way of further illustration.

(Appendix 1) A robot control system for controlling a robot according to a user operation, comprising:
  an inference unit configured to output a degree of distribution based on a learned model generated based on a past manipulation, the learned model outputting at least the degree of distribution in response to at least a state difference between a current state of the robot and a target state being input, the degree of distribution being a degree of distribution of a motion of the robot in the state difference;
  a setting unit configured to set a level of assistance which is a degree of assisting a manipulation of the robot, based on the degree of distribution output from the learned model; and
  a generation unit configured to generate an output command value to be output to the robot, based on an input command value input from an operating device by the user operation and the level of assistance.

(Appendix 2) The robot control system according to appendix 1,
  wherein the learned model outputs a predicted command value which is a command value predicted based on the past manipulation, in addition to the degree of distribution, and the generation unit is configured to generate the output command value based on the input command value, the level of assistance, and the predicted command value.

(Appendix 3) The robot control system according to appendix 2, wherein the generation unit is configured to combine the input command value and the predicted command value at a ratio corresponding to the level of assistance to generate the output command value.

(Appendix 4) The robot control system according to any one of appendices 1 to 3, further comprising a selection unit configured to select, from a plurality of the learned models corresponding to a plurality of tasks executable by the robot, the learned model corresponding to the task to be executed by the robot,
wherein the inference unit is configured to output the degree of distribution based on the selected learned model.

(Appendix 5) The robot control system according to appendix 4, further comprising an identification unit configured to identify a task to be executed by the robot based on sensor data,
wherein the selection unit is configured to select the learned model based on the identified task.

(Appendix 6) The robot control system according to any one of appendices 1 to 5, wherein the learned model outputs the degree of distribution based on a Gaussian process.

(Appendix 7) The robot control system according to any one of appendices 2 to 6,
wherein the learned model includes a first model generated based on the past manipulation of another user different from the user,
the inference unit is configured to output a first degree of distribution output from the first model,
the setting unit is configured to set a first level of assistance based on the first degree of distribution, and
the generation unit is configured to generate the output command value based on the input command value and the first level of assistance.

(Appendix 8) The robot control system according to appendix 7, wherein the first model is a master model generated based on the past manipulation of an expert who is more skilled in manipulation than the user.

(Appendix 9) The robot control system according to appendix 7 or 8,
wherein the learned model includes a second model generated based on the past manipulation by the user,
the inference unit is configured to output a second degree of distribution output from the second model,
the setting unit is configured to set a second level of assistance based on the second degree of distribution, and
the generation unit is configured to generate the output command value based on the input command value, the first level of assistance, and the second level of assistance.

(Appendix 10) The robot control system according to appendix 9, wherein the generation unit is configured to:
generate the output command value based on the input command value, the first level of assistance, and a predicted command value which is a command value predicted based on the past manipulation and is output from the first model, in response to the second level of assistance being greater than or equal to a threshold; and
generate the output command value based on the input command value without using the first level of assistance and the predicted command value, in response to the second level of assistance being less than the threshold.

(Appendix 11) A robot control system according to any one of appendices 1 to 10, wherein the robot is located remotely from the user.

(Appendix 12) The robot system comprising:
the robot; and
the robot control system according to any one of appendices 1 to 11.

(Appendix 13) A manipulation system comprising:
a manipulation controller configured to receive the user operation; and
the robot control system according to any one of appendices 1 to 11.

(Appendix 14) A robot control method executed by a robot control system including at least one processor for controlling a robot according to a user operation, the method comprising:
outputting a degree of distribution based on a learned model generated based on a past manipulation, the learned model outputting at least the degree of distribution in response to at least a state difference between a current state of the robot and a target state being input, the degree of distribution being a degree of distribution of a motion of the robot in the state difference;
setting a level of assistance which is a degree of assisting a manipulation of the robot, based on the degree of distribution output from the learned model; and
generating an output command value to be output to the robot, based on an input command value input from an operating device by the user operation and the level of assistance.

(Appendix 15) A robot control program for causing a computer to function as a robot control system including at least one processor for controlling a robot according to a user operation, the robot control program causing the computer to execute:
outputting a degree of distribution based on a learned model generated based on a past manipulation, the learned model outputting at least the degree of distribution in response to at least a state difference between a current state of the robot and a target state being input, the degree of distribution being a degree of distribution of a motion of the robot in the state difference;
setting a level of assistance which is a degree of assisting a manipulation of the robot, based on the degree of distribution output from the learned model; and
generating an output command value to be output to the robot, based on an input command value input from an operating device by the user operation and the level of assistance.

What is claimed is:

1. A robot control system comprising circuitry configured to:
acquire an input command value indicating a manipulation of a robot by a subject user;
acquire a current state of the robot and a target state associated with the manipulation of the robot;
determine a state difference between the current state and the target state;
acquire from a learned model, a degree of distribution associated with a motion of the robot, based on the state difference, wherein the learned model includes a first model generated based on a past manipulation by another user different from the subject user, and a second model generated based on a past manipulation by the subject user, and wherein the degree of distribution includes a first degree of distribution acquired from the first model and a second degree of distribution acquired from the second model;
set a level of assistance to be given during the manipulation of the robot by the subject user, based on the degree of distribution acquired, wherein the level of assistance includes a first level of assistance that is set based on the first degree of distribution, and a second level of assistance that is set based on the second degree of distribution; and
generate an output command value for operating the robot, based on the input command value and the level of assistance.

2. The robot control system according to claim 1, wherein the circuitry is further configured to acquire from the learned model, a predicted command value which is predicted based on the past manipulation by the other user, and
wherein the output command value is generated based further on the predicted command value.

3. The robot control system according to claim 2, wherein the circuitry is further configured to:
calculate weighted values of the input command value and of the predicted command value according to respective weights associated with the level of assistance;
add the weighted values to obtain a combined command value; and
generate the output command value based on the combined command value.

4. The robot control system according to claim 1, wherein the circuitry is further configured to:
identify a task to be executed by the robot; and
select the learned model from a plurality of learned models corresponding to a plurality of tasks executable by the robot, based on the task identified.

5. The robot control system according to claim 4, wherein the task to be executed by the robot is identified based on sensor data indicating a response of the robot to the input command value.

6. The robot control system according to claim 1, wherein the degree of distribution is a variance calculated based on a Gaussian process.

7. The robot control system according to claim 1, wherein the degree of distribution indicates a degree of certainty of manipulation by the other user that is associated with the state difference.

8. The robot control system according to claim 1, wherein the level of assistance is set to increase in response to a decrease in the degree of distribution.

9. The robot control system according to claim 1, wherein, the other user has a greater skill level in robot manipulation than the subject user.

10. The robot control system according to claim 9, wherein the output command value is generated based on the input command value, the first level of assistance, and the second level of assistance.

11. The robot control system according to claim 10, wherein the second degree of distribution indicates a degree of similarity between the manipulation indicated by the input command value and the past manipulation by the subject user that is associated with the state difference.

12. The robot control system according to claim 10, wherein the second level of assistance is set to increase in response to a decrease in the second degree of distribution.

13. The robot control system according to claim 10, wherein the output command value is generated based on a comparison of the second level of assistance with a threshold.

14. The robot control system according to claim 13, wherein the circuitry is further configured to:
acquire from the first model, a predicted command value which is predicted based on the past manipulation by the other user;
calculate weighted values of the input command value and of the predicted command value according to respective weights associated with the first level of assistance; and
add the weighted values to obtain a combined command value,
wherein the output command value is generated based on the combined command value, in response to the second level of assistance being equal to or greater than the threshold.

15. The robot control system according to claim 13, wherein the output command value is generated by setting the input command value as the output command value, in response to the second level of assistance being less than the threshold.

16. The robot control system according to claim 1, further comprising the robot.

17. The robot control system according to claim 1, further comprising a manipulation controller configured to receive the manipulation by the subject user.

18. A robot control method executable by a robot control system including at least one processor, the method comprising:
acquiring an input command value indicating a manipulation of a robot by a subject user;
acquiring a current state of the robot and a target state associated with the manipulation of the robot;
determining a state difference between the current state and the target state;
acquiring from a learned model, a degree of distribution associated with a motion of the robot, based on the state difference, wherein the learned model includes a first model generated based on a past manipulation by another user different from the subject user, and a second model generated based on a past manipulation by the subject user, and wherein the degree of distribution includes a first degree of distribution acquired from the first model and a second degree of distribution acquired from the second model;
setting a level of assistance to be given during the manipulation of the robot by the subject user, based on the degree of distribution acquired, wherein the level of assistance includes a first level of assistance that is set based on the first degree of distribution, and a second level of assistance that is set based on the second degree of distribution; and
generating an output command value for operating the robot, based on the input command value, the first level of assistance, and the second level of assistance.

19. A non-transitory computer-readable storage medium storing processor-executable instructions to:
acquire an input command value indicating a manipulation of a robot by a subject user;
acquire a current state of the robot and a target state associated with the manipulation of the robot;
determine a state difference between the current state and the target state;

acquire from a learned model, a degree of distribution associated with a motion of the robot, based on the state difference, wherein the learned model includes a first model generated based on a past manipulation by another user different from the subject user, the other user having a greater skill level in robot manipulation than the subject user, and a second model generated based on a past manipulation by the subject user, and wherein the degree of distribution includes a first degree of distribution acquired from the first model and a second degree of distribution acquired from the second model;

set a level of assistance to be given during the manipulation of the robot by the subject user, based on the degree of distribution acquired, wherein the level of assistance includes a first level of assistance that is set based on the first degree of distribution, and a second level of assistance that is set based on the second degree of distribution; and generate an output command value for operating the robot, based on the input command value and the level of assistance.

20. The robot control method according to claim 18, wherein the second degree of distribution indicates a degree of similarity between the manipulation indicated by the input command value and the past manipulation by the subject user that is associated with the state difference.

* * * * *